US009195717B2

(12) United States Patent
Miller et al.

(10) Patent No.: US 9,195,717 B2
(45) Date of Patent: Nov. 24, 2015

(54) IMAGE RESULT PROVISIONING BASED ON DOCUMENT CLASSIFICATION

(71) Applicant: Google Inc., Mountian View, CA (US)

(72) Inventors: David Ross Hertzman Miller, Mountain View, CA (US); Tova Wiener Nadler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 13/799,683

(22) Filed: Mar. 13, 2013

(65) Prior Publication Data

US 2015/0161129 A1   Jun. 11, 2015

Related U.S. Application Data

(60) Provisional application No. 61/664,409, filed on Jun. 26, 2012.

(51) Int. Cl.
*G06F 17/30* (2006.01)

(52) U.S. Cl.
CPC .................................. *G06F 17/3053* (2013.01)

(58) Field of Classification Search
CPC ..................... G06F 17/30864; G06F 17/30867
USPC ......................................................... 707/728
See application file for complete search history.

(56) References Cited

U.S. PATENT DOCUMENTS

| | | | | |
|---|---|---|---|---|
| 6,665,668 | B1 * | 12/2003 | Sugaya et al. | 707/730 |
| 7,039,856 | B2 * | 5/2006 | Peairs et al. | 715/200 |
| 7,844,591 | B1 * | 11/2010 | Lettau et al. | 707/706 |
| 7,877,384 | B2 * | 1/2011 | Yu et al. | 707/723 |
| 8,082,248 | B2 * | 12/2011 | Abouyounes | 707/731 |
| 8,209,330 | B1 * | 6/2012 | Covell et al. | 707/728 |
| 8,370,282 | B1 * | 2/2013 | Leung et al. | 706/20 |
| 8,489,627 | B1 * | 7/2013 | Brandt | 707/765 |
| 8,631,012 | B2 * | 1/2014 | Leblang et al. | 707/741 |
| 8,775,436 | B1 * | 7/2014 | Zhou et al. | 707/748 |
| 8,868,548 | B2 * | 10/2014 | Kurzion | 707/723 |
| 2007/0019864 | A1 * | 1/2007 | Koyama et al. | 382/218 |
| 2009/0049032 | A1 * | 2/2009 | Maghoul et al. | 707/5 |
| 2009/0183115 | A1 * | 7/2009 | Iwasaki | 715/810 |
| 2009/0287676 | A1 * | 11/2009 | Dasdan | 707/5 |
| 2011/0029513 | A1 * | 2/2011 | Morris | 707/728 |
| 2011/0029541 | A1 * | 2/2011 | Schulman | 707/748 |
| 2011/0252028 | A1 * | 10/2011 | Jensen | 707/728 |
| 2012/0166441 | A1 * | 6/2012 | Karidi et al. | 707/740 |
| 2012/0209838 | A1 * | 8/2012 | Dean et al. | 707/725 |
| 2012/0233178 | A1 * | 9/2012 | Oztekin et al. | 707/748 |
| 2012/0290566 | A1 * | 11/2012 | Dasher et al. | 707/723 |
| 2013/0067364 | A1 * | 3/2013 | Berntson et al. | 715/764 |

* cited by examiner

*Primary Examiner* — Rehana Perveen
*Assistant Examiner* — Hicham Skhoun
(74) *Attorney, Agent, or Firm* — Harrity & Harrity, LLP

(57) ABSTRACT

A system is configured to receive a search query; obtain search results, based on the search query, that identify documents relevant to the search query; identify image attributes associated with one or more of the documents; obtain classification metrics that include information for determining a measure of image intent associated with the one or more of the documents; determine the measure of image intent, associated with the one or more of the documents, based on the image attributes and the classification metrics; determine whether the measure of image intent satisfies a threshold; generate a search results document that selectively includes the image results or the search results based on whether the measure of image intent satisfies the threshold; and provide the search results document.

20 Claims, 9 Drawing Sheets

| CLASSIFICATION METRICS 505 | HIGH PROBABILITY 510 | LOW PROBABILITY 515 |
|---|---|---|
| KEYWORDS | KW - HIGH | KW - LOW |
| KEYWORD DENSITY | KD - HIGH | KD - LOW |
| IMAGE DENSITY | ID - HIGH | ID - LOW |
| IMAGE RATIO | IR - HIGH | IR - LOW |
| IMAGES | IT - HIGH | IT - LOW |
| 522 | 524 | 526 |

FIG. 5

IMAGE RESULT PROVISIONING BASED ON DOCUMENT CLASSIFICATION

RELATED APPLICATION

This application is a non-provisional application of U.S. Provisional Application No. 61/664,409, filed Jun. 26, 2012, the entire contents of which are hereby incorporated by reference.

BACKGROUND

Many techniques are available to users today to find information on the World Wide Web ("web"). For example, users often use web browsers and/or search engines to find information of interest.

Search engines provide search results in response to a search query from a user. The search results typically include links to web sites that allow the users to access documents, such as web pages and/or other documents.

SUMMARY

According to some possible implementations, a method, performed by one or more server devices, may include receiving, from a client, a search query; obtaining search results based on the search query, where the search results may identify documents relevant to the search query; identifying image attributes associated with one or more of the documents, where the image attributes may identify information, within the one or more of the documents, associated with images; obtaining classification metrics that include information for determining a measure of image intent associated with the one or more of the documents, where the measure of image intent may represent a likelihood that image results are intended by the search query, and where the image results may identify images or video relevant to the search query; determining the measure of image intent, associated with the search query, based on the image attributes and the classification metrics; determining whether the measure of image intent satisfies a threshold, where the threshold may be identified by the classification metrics; generating a search results document that selectively includes the image results or the search results based on whether the measure of image intent satisfies the threshold; and providing, to the client, the search results document.

According to some possible implementations, determining the measure of image intent may include determining that the measure of image intent does not satisfy the threshold; and generating the search results document may include formatting the search results document to include the search results and not include the image results when the measure of image intent does not satisfy the threshold.

According to some possible implementations, the search results may include links via which the documents can be accessed, the documents may correspond to web pages associated with the links, and the image results may be associated with at least one of: images that are relevant to the search query, or video content that is relevant to the search query.

According to some possible implementations, the image attributes, for a particular document of the one or more of the documents, may correspond to at least one of: a quantity of keywords, within the particular document, that match keywords identified by the classification metrics; a keyword density based on the quantity of keywords and a quantity of text within the particular document; a quantity of images or videos identified within the particular document; an image-to-text ratio based on the quantity of images and the quantity of text; or an image density based on a first area, within the particular document, associated with the quantity of images or videos and a second area associated with the particular document.

According to some possible implementations, the classification metrics may include at least one of: a set of keywords associated with a predetermined document that was obtained based on a particular search query associated with a measure of image intent that reflects an intent for image results; a quantity of keywords that is based on the set of keywords; a keyword density of the predetermined document; a quantity of images or videos associated with the predetermined document; an image-to-text ratio of the predetermined document; or an image density of the predetermined document.

According to some possible implementations, determining the measure of image intent may further include at least two of: assigning a first score to a first document, of the one or more of the documents, based on a particular quantity of keywords, within the first document, that matches the set of keywords; assigning a second score, to the first document, based on a particular keyword density of the first document and the keyword density; assigning a third score, to the first document, based on a particular quantity of images or videos, associated with the first document, and the quantity of images or videos; assigning a fourth score, to the first document, based on a particular image-to-text ratio, of the first document, and the image-to-text ratio; or assigning a fifth score, to the first document, based on a particular image density of the first document and the image density; and generating a combined score, for the first document, based on at least two of the first score, the second score, the third score, the fourth score, or the fifth score.

According to some possible implementations, determining the measure of image intent may further include generating an image intent score, associated with the one or more of the documents, based on a respective combined score generated for each of the one or more of the documents; and generating the search results document may include formatting the search results document based on generating the image intent score, where the search results document may include the image results without the search results when the image intent score satisfies a first threshold identified by the classification metrics; the search results document may include the search results without the image results when the image intent score does not satisfy a second threshold identified by the classification metrics, where the second threshold may be less than the first threshold; or the search results document may include a combination of all or a portion of the search results and the image results when the image intent score does not satisfy the first threshold and satisfies the second threshold.

According to some possible implementations, the method may further include determining a first quantity of the one or more of the documents with combined scores that do not satisfy a particular threshold and a second quantity, of the one or more of the documents, with combined scores that satisfy the particular threshold, the particular threshold being identified by the classification metrics; and generating the search results document may include formatting the search results document based on the first quantity and the second quantity, where the search results document may include the search results and not include the image results when the first quantity is less than the second quantity, and the search results document may include the image results and not include the search results when first quantity is not less than the second quantity.

According to some possible implementations, the method may further include obtaining first search results based on first predetermined search queries that are known to be associated with first measures of image intent that reflect an intent for image results; obtaining second search results based on second predetermined search queries that are known to be associated with second measures of image intent that do not reflect an intent for image results; identifying first image attributes corresponding to documents associated with the first search results; identifying second image attributes corresponding to documents associated with the second search results; and generating the classification metrics based on the first image attributes and the second image attributes.

According to some possible implementations, a computer-readable medium may include a set of instructions which, when executed by one or more processors, cause the one or more processors to: receive a search query from a client; obtain search results based on the search query, where the search results may identify documents relevant to the search query; identify image attributes associated with one or more of the documents, where the image attributes may identify information, within the one or more of the documents, associated with images; obtain classification metrics that include information for determining a measure of image intent associated with the one or more of the documents, where the measure of image intent may represent a likelihood that image results are intended for the search query, and where the image results may identify images or videos relevant to the search query; determine the measure of image intent, associated with the one or more of the documents, based on the image attributes and the classification metrics; determine whether the measure of image intent satisfies a threshold, the threshold being identified by the classification metrics; generate a search results document that selectively includes the image results or the search results based on whether the measure of image intent satisfies the threshold; and provide, to the client, the search results document.

According to some possible implementations, one or more instructions, of the set of instructions, to determine whether the measure of image intent satisfies the threshold may further cause the one or more processors to determine that the measure of image intent does not satisfy the threshold; and one or more instructions, of the set of instructions, to generate the search results document may further cause the one or more processors to format the search results document to include the search results and not include the image results.

According to some possible implementations, the classification metrics may include at least one of: a set of keywords associated with a predetermined document that was obtained based on a particular search query associated with a measure of image intent that reflects an intent for image results; a quantity of keywords that is based on the set of keywords; a keyword density of the predetermined document; a quantity of images or videos associated with the predetermined document; an image-to-text ratio of the predetermined document; or an image density of the predetermined document.

According to some possible implementations, one or more instructions, of the set of instructions, to determine the measure of image intent, may further cause the one or more processors to at least two of: assign a first score to a first document, of the one or more of the documents, based on a particular quantity of keywords, within the first document, that match the set of keywords; assign a second score, to the first document, based on a particular keyword density of the first document and the keyword density; assign a third score, to the first document, based on a particular quantity of images or videos, associated with the first document, and the quantity of images or videos; assign a fourth score, to the first document, based on a particular image-to-text ratio, of the first document, and the image-to-text ratio; or assign a fifth score, to the first document, based on a particular image density of the fifth document and the image density; and generate a combined score, for the first document, based on at least two of the first score, the second score, the third score, the fourth score, or the fifth score.

According to some possible implementations, one or more instructions, of the set of instructions, to determine the measure of image intent may further cause the one or more processors to generate an image intent score, associated with the one or more of the documents, based on a respective combined score generated for each of the one or more of the documents; and one or more instructions, of the set of instructions, to generate the search results document may further cause the one or more processors to format the search results document based on generating the image intent score, where the search results document may include the image results without the search results when the image intent score satisfies a first threshold identified by the classification metrics, the search results document may include the search results without the image results when the image intent score does not satisfy a second threshold identified by the classification metrics, where the second threshold may be less than the first threshold, or the search results document may include a combination of all or a portion of the search results and the image results when the image intent score does not satisfy the first threshold and satisfies the second threshold.

According to some possible implementations, a system may include one or more server devices to receive a search query from a client; obtain search results based on the search query, where the search results may identify documents relevant to the search query; identify image attributes associated with one or more of the documents, where the image attributes may identify information, within the one or more of the documents, associated with the images; obtain classification metrics that include information for determining a measure of image intent associated with the one or more of the documents, where the measure of image intent may represent a likelihood that image results are intended by the search query, and where the image results may identify images or videos relevant to the search query; determine the measure of image intent, associated with the search query, based on the image attributes and the classification metrics; determine whether the measure of image intent satisfies a threshold, where the threshold may be identified by the classification metrics; generate a search results document that selectively includes the image results or the search results; and provide, to the client, the search results document.

According to some possible implementations, the one or more server devices, when determining the measure of image intent, may determine that the measure of image intent does not satisfy the threshold; and the one or more server devices, when generating the search results document, may format the search results document to include the search results and not include the image results.

According to some possible implementations, the classification metrics may include at least one of: a first threshold associated with a quantity of keywords within a predetermined document that was obtained based on a particular search query associated with a measure of image intent that reflects an intent for images; a second threshold associated with a keyword density of the predetermined document; a third threshold associated with a quantity of images within the predetermined document; a fourth threshold associated with an image-to-text ratio of the predetermined document; or a fifth threshold associated with an image density of the predetermined document.

According to some possible implementations, the one or more server devices, when determining the measure of image intent, may at least two of: assign a first score to a first document, of the one or more of the documents, based on a quantity of keywords, within the first document, that match keywords identified by the classification metrics, assign a second score, to the first document, based on a first keyword density of the first document and a second keyword density identified by the classification metrics, assign a third score, to the first document, based on a first quantity of images or videos, associated with the first document, and a second quantity of images or videos identified by the classification metrics, assign a fourth score, to the first document, based on a first image-to-text ratio, of the first document, and a second image-to-text ratio identified by the classification metrics, or assign a fifth score, to the first document, based on a first image density, of the first document, and a second image density identified by the classification metrics; and generate a combined score, for the first document, based on at least two of the first score, the second score, the third score, the fourth score, or the fifth score.

According to some possible implementations, the one or more server devices, when determining the measure of image intent, may determine a first quantity of the one or more of the documents with combined scores that do not satisfy a particular threshold and a second quantity, of the one or more of the documents, with combined scores that satisfy the particular threshold, where the particular threshold may be identified by the classification metrics; and the one or more server devices, when generating the search results document, may format the search results document based on the first quantity and the second quantity, where the search results document may include the search results and not include the image results when the first quantity is less than the second quantity, and where the search results document may include the image results and not include the search results when first quantity is not less than the second quantity.

According to some possible implementations, the one or more server devices may further obtain first search results based on first predetermined search queries that are known to be associated with first measures of image intent that reflect an intent for images; obtain second search results based on second predetermined search queries that are known to be associated with second measures of image intent that do not reflect an intent for images; identify first image attributes corresponding to documents associated with the first search results; identify second image attributes corresponding to documents associated with the second search results; and generate the classification metrics based on the first image attributes and the second image attributes.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 is a diagram of an example data structure that stores classification metrics used for determining image intent;

DETAILED DESCRIPTION

The following detailed description refers to the accompanying drawings. The same reference numbers in different drawings may identify the same or similar elements.

A system and/or method, as described herein, may enable a search system to identify measures of image intent for documents, associated with search results that are generated by the search system, in response to receiving a search query. The measure of image intent may represent a probability that a user, of a client device from which the search query was received, intended that image results be provided based on the search query. The measure of image intent may, thus, enable the search system to determine whether to generate and/or provide the search results with or without the image results.

A search result, as the term is used herein, includes any reference to a document that is identified as relevant to a search query. A search result commonly includes a title of the document and a link to, or an address of, the document, and may also include a snippet of text from the document. A document, as the term is used herein, includes any machine-readable and machine-storable work product. A document may include, for example, an e-mail, a web site, a file, a combination of files, one or more files with embedded links to other files, a news article, a blog, an image, a discussion group forum, etc. In the context of the Internet, a common document is a web page. Web pages often include textual information and may include embedded information, such as meta information, images, hyperlinks, etc., and/or embedded instructions, such as a script. A link, as the term is used herein, includes any reference to a document from another document or another part of the same document.

An image result, as the term is used herein, includes any reference to an image and/or video that is identified as relevant to a search query. An image result may, for example, include information that describes the image, such as, a caption associated with the image; a link to the image; an address associated with the image; a copy of the image, e.g., a thumbnail of the image; an icon associated with the image; etc.

Figure 1A:
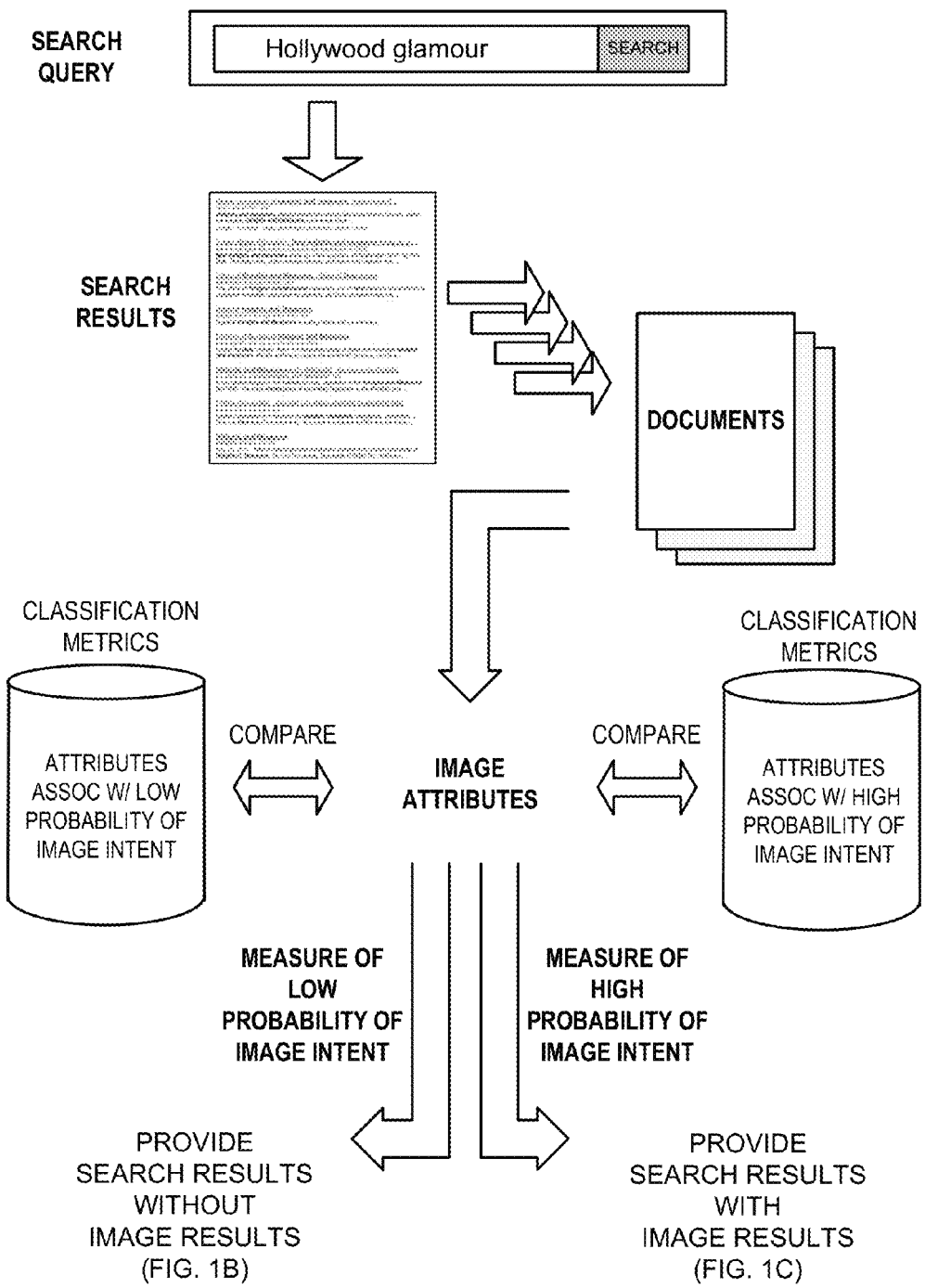
FIGS. 1A-1C are diagrams illustrating an overview of an example implementation described herein.
Figure 1B:
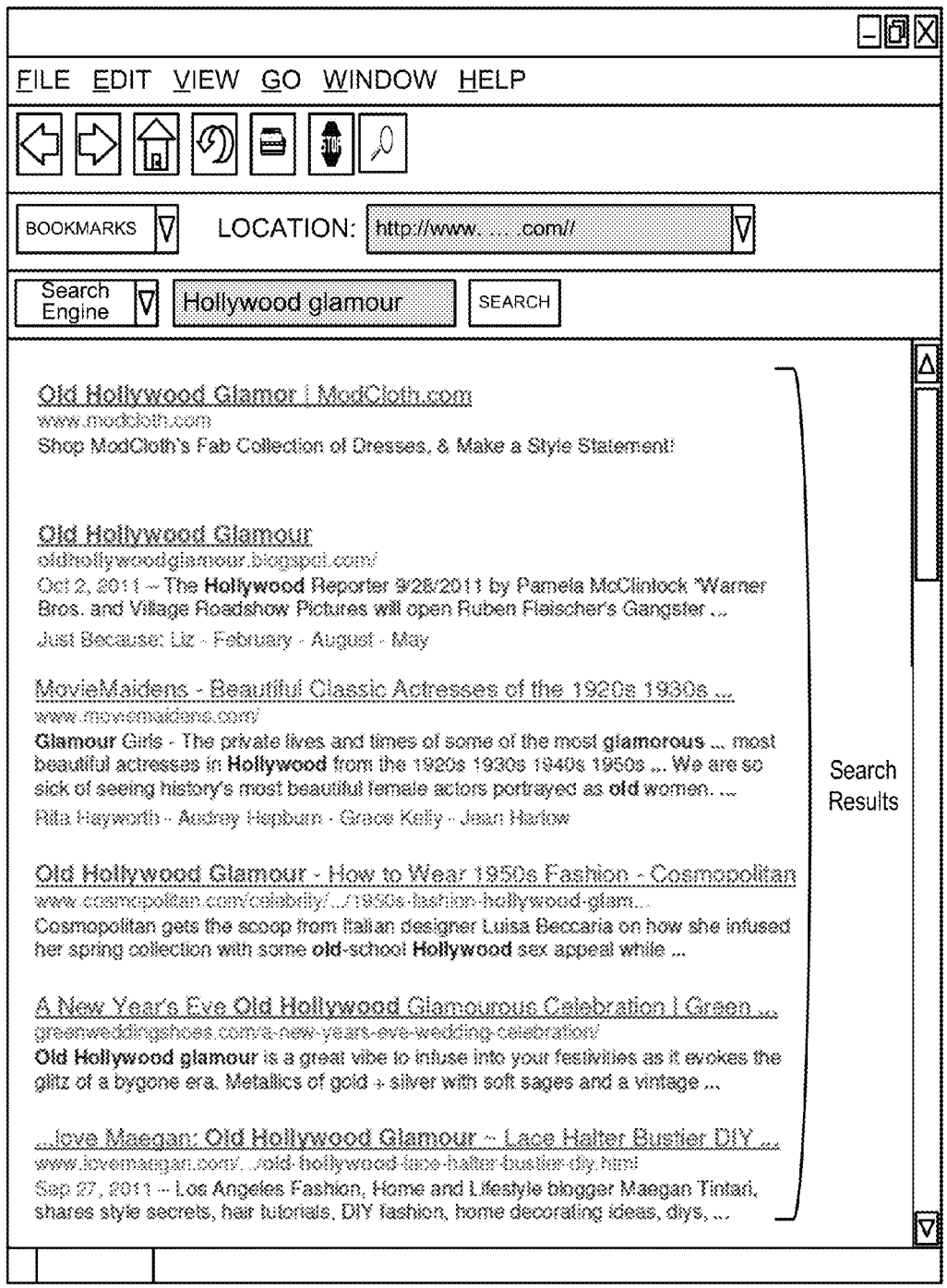
Figure 1C:
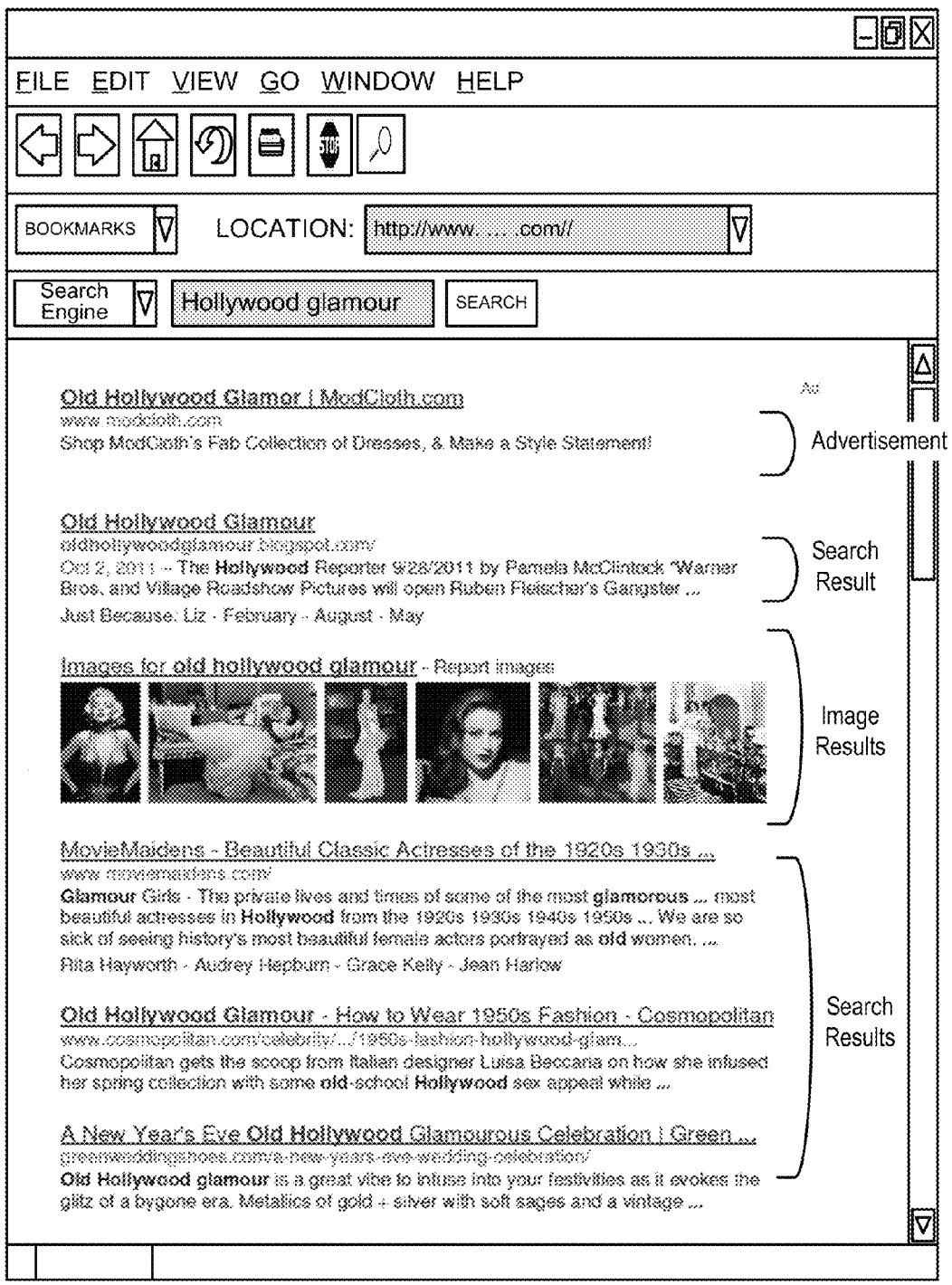

FIGS. 1A-1C are diagrams illustrating an overview of an example implementation described herein. Assume, for the example implementation described with respect to FIGS. 1A-1C, that a user desires a search result relating to the search query "Hollywood glamour."

As shown in FIG. 1A, the user may use a web browser to access a search system and provide, to the search system, the search query "Hollywood glamour." The user may instruct the search system to perform a search, based on the search query, by selecting a search button. In response to the search query, the search system may perform a search of one or more indexes and identify documents, as search results, that are relevant to the search query. The search system may analyze one or more of the documents associated with the search results to identify image attributes associated with the documents. The image attributes for a particular document may correspond to a quantity of images; an image-to-text ratio, e.g., the quantity of images relative to a quantity of text within the particular document; an image density, e.g., an area associated with images relative to an area associated with content within the document; a quantity of keywords relating to subject matter associated with an image or video, e.g., "image," "picture," "photograph," "movie," "video," "camera," etc.; a keyword density—e.g., the quantity of keywords relative to the quantity of text, etc.; etc.

The search system may compare the image attributes of the documents to classification metrics to determine a degree of match between the image attributes and the classification metrics. The classification metrics may identify image attributes associated with a first set of predetermined documents obtained based on search queries associated with a low probability of image intent—e.g., when a measure of image intent does not satisfy a particular probability threshold. The classification metrics may also identify image attributes associated with a second set of predetermined documents obtained based on search queries associated with a high probability of image intent—e.g., when a measure of image intent satisfies the particular probability threshold or satisfies another probability threshold.

The search system may compare the image attributes to the classification metrics and may determine a measure of image intent, associated with the search query, based on the degree of match between the image attributes and the classification metrics. Based on a determination that the image attributes correspond to classification metrics associated with a low probability of image intent, the search system may provide the search results in a manner that does not include image results as described below with respect to FIG. 1B. If, however, the image attributes correspond to classification metrics that are associated with a high probability of image intent, the search system may provide the search results and image results that are relevant to the search query as described below with respect to FIG. 1C.

FIG. 1B illustrates a search results document that includes a list of search results that may be provided by the search system. As shown in FIG. 1B, the search system may order the search results, based on a relative measure of relevance to the search query. Additionally, or alternatively, the search results document may not include image results based on the determination that the measure of image intent, associated with the search query, corresponds to a low probability of image intent.

FIG. 1C illustrates a search results document that includes a list of one or more search results and/or one or more image results that may be provided by the search system. As shown in FIG. 1C, the search system may provide the search results document that includes search results and image results when the measure of image intent, associated with the search query, corresponds to high probability of image intent—e.g., as shown in FIG. 1C. The search system may also, or alternatively, order each of the search results and/or image results, based on a respective measure of relevance to the search query.

In some implementations, the search system may provide a first search results document where the image results are interleaved among the search results—e.g., based on the respective measure of relevance to the search query. The search system may, in some implementations, provide the search results in one portion of a search results document and the image results in another, different portion of the search results document. In yet another example, the search system may provide a search results document that includes image results and does not include the search results.

While the description, herein, will focus on when and how to present image results, the implementations are not so limited. For example, some implementations may relate to when and how to present other types of results, such as video results, news results, product results, map results, or the like.

Figure 2:
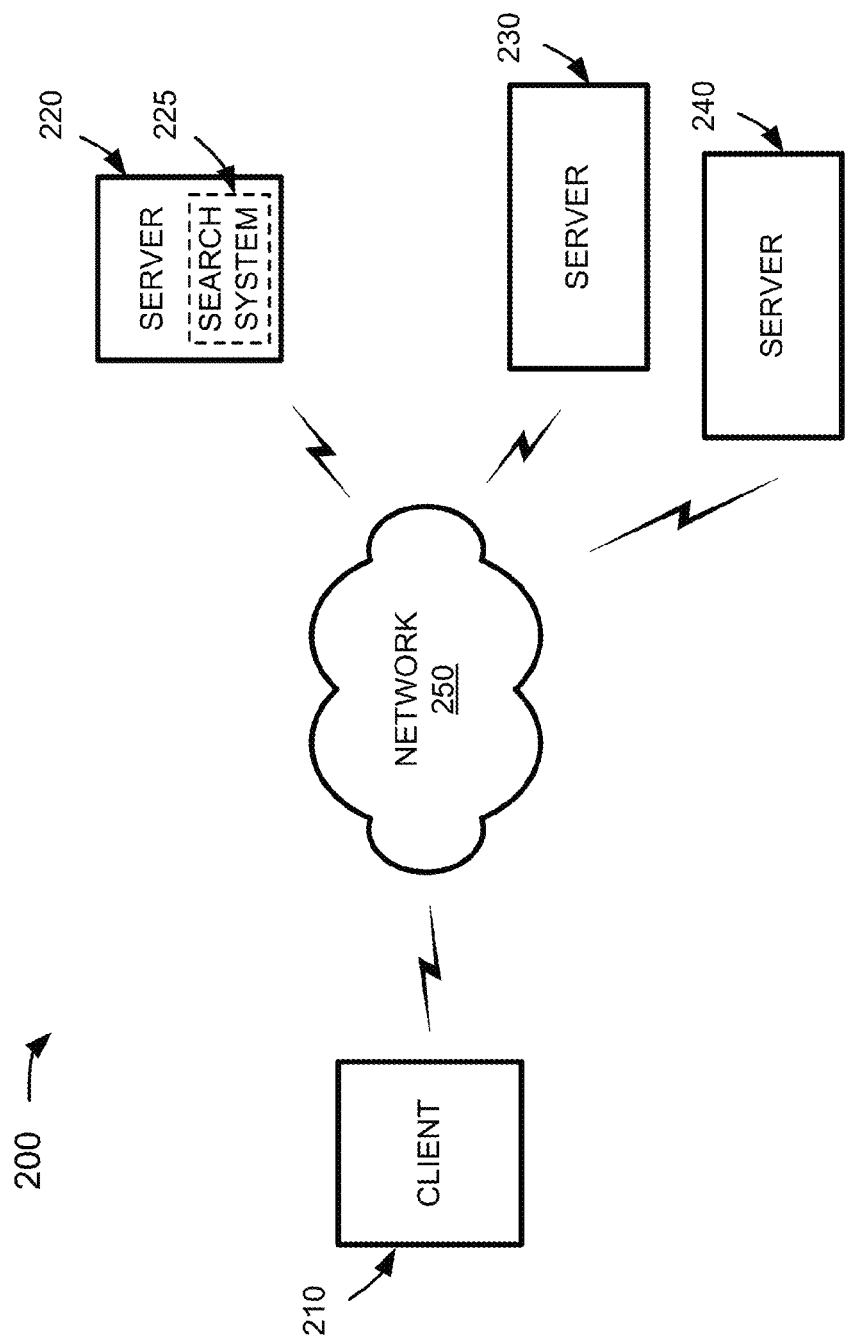
FIG. 2 is a diagram of an example environment in which techniques described herein may be implemented.

FIG. 2 is a diagram of an example environment 200 in which techniques described herein may be implemented. Environment 200 may include client 210 connected to multiple servers 220, 230, and 240 via a network 250. One client 210 and three servers 220, 230, and 240 have been illustrated as connected to network 250 for simplicity. In practice, environment 200 may include additional clients, networks, and/or servers; fewer clients, networks, and/or servers; different clients, networks, and/or servers; or differently arranged clients and/or servers than are shown in environment 200. Also, in some instances, a client may perform a function of a server, or a server may perform a function of a client.

Client 210 may include a client device, such as personal computer, a wireless telephone, a personal digital assistant ("PDA"), a laptop, a tablet computer, or another type of computation or communication device. Client 210 may include user interfaces presented through one or more browsers, e.g., web browsers, etc.

Servers 220, 230, and 240 may include server devices that gather, process, search, and/or perform functions in a manner described herein. Each server 220, 230, or 240 may be implemented as a single server device or a collection of server devices that may be co-located or remotely located. Additionally, or alternatively, any two or more of servers 220, 230, and 240 may be implemented within a single, common server device or a single, common collection of server devices. While servers 220, 230, and 240 are shown as separate components, it may be possible for one or more of servers 220, 230, and/or 240 to perform one or more of the functions of another one or more of servers 220, 230, and/or 240.

As shown in FIG. 2, server 220 may implement a search system 225 that receives a search query from client 210, and that provides a list of search results that are identified as relevant to the search query. Search system 225 may also, or alternatively, provide a list of image results that are identified as relevant to the search query. Server 220 may crawl a corpus of documents, e.g., web documents, index the documents, and store information associated with the documents in a repository of documents. Servers 230 and 240 may store or maintain documents that may be crawled or analyzed by server 220.

Network 250 may include any type of network, such as a local area network ("LAN"), a wide area network ("WAN"), a telephone network, such as the Public Switched Telephone Network ("PSTN") or a cellular network, an intranet, the Internet, or a combination of networks. Client 210 and servers 220, 230, and 240 may connect to network 250 via wired and/or wireless connections. In other words, any one of client 210 or server 220, 230, or 240 may connect to network 250 via a wired connection, a wireless connection, or a combination of a wired connection and a wireless connection.

Figure 3:
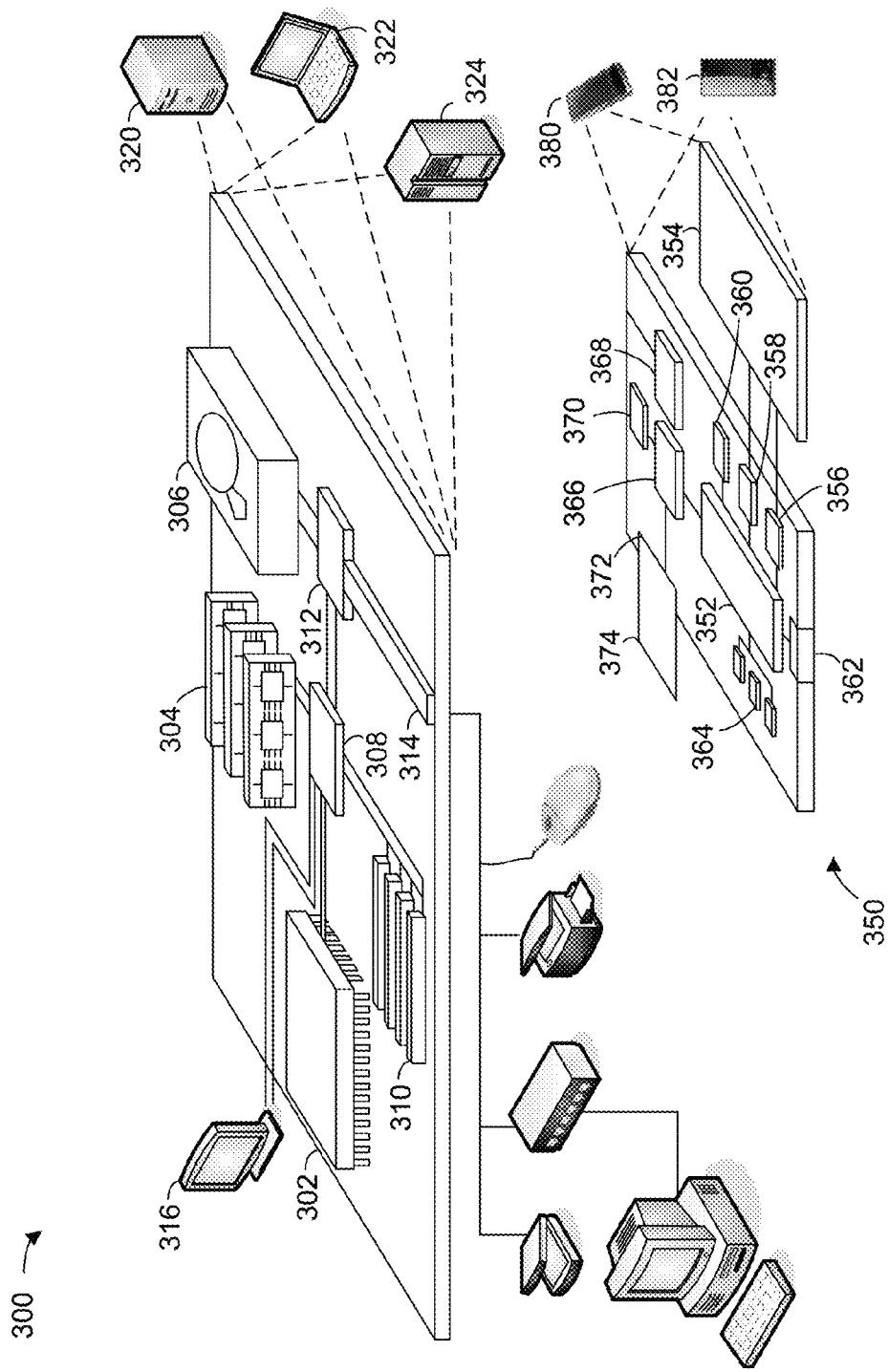
FIG. 3 is a diagram of an example of a generic computer device and a generic mobile computer device.

FIG. 3 is a diagram of an example of a generic computing device 300 and a generic mobile computing device 350, which may be used with the techniques described here. Generic computing device 300 or generic mobile computing device 350 may correspond to, for example, a client 210 and/or a server 220, 230, or 240. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations described herein.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface (GUI) on an external input/output device, such as display 316 coupled to high speed interface 308. In some implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within the computing device 300. In some implementations, memory 304 includes a volatile memory unit or units. In some implementations, memory 304 includes a non-volatile memory unit or units. The memory 304 may also be another form of computer-readable medium, such as a magnetic or optical disk. A computer-readable medium may refer to a non-transitory memory device. A memory device may refer to storage space within a single storage device or storage space spread across multiple storage devices.

The storage device 306 is capable of providing mass storage for the computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is provided for explanatory purposes only. In some implementations, high-speed controller 308 is coupled to memory 304, display 316, e.g., through a graphics processor or accelerator, and to high-speed expansion ports 310, which may accept various expansion cards. In these implementations, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a microdrive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in some implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a Single In Line Memory Module (SIMM) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer-or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, Global Positioning System (GPS) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed application specific integrated circuits (ASICs), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with some implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
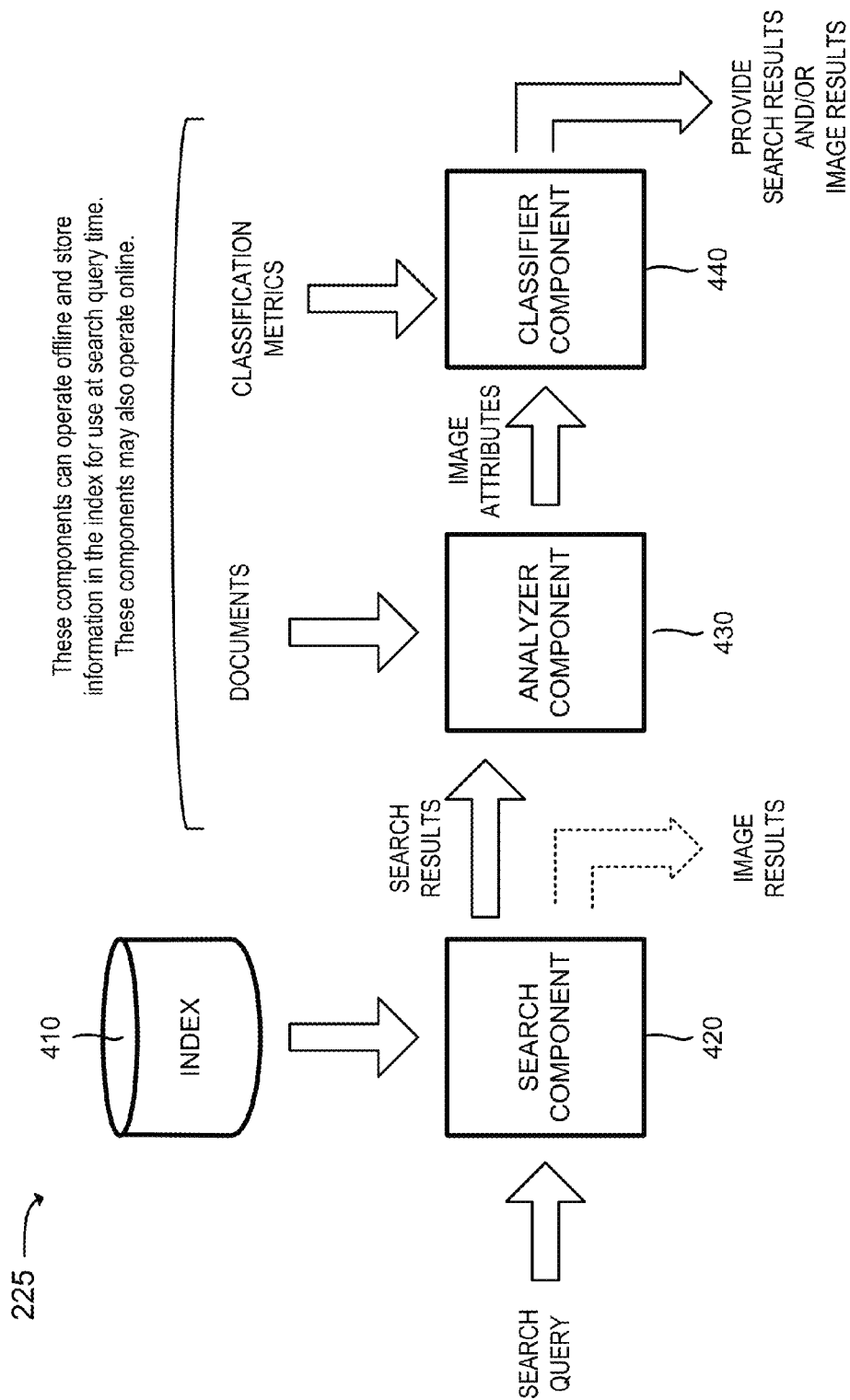
FIG. 4 is a diagram of example functional components of a search system of FIG. 1.

FIG. 4 is a diagram of example functional components of search system 225. Each of the functional blocks, shown in FIG. 4, may be implemented by one or more of the components described with regard to FIG. 3. As shown in FIG. 4, search system 225 may include an index 410, a search component 420, an analyzer component 430, and a classifier component 440. In some implementations, search system 225 may include additional functional components, fewer functional components, different functional components, or differently arranged functional components than are illustrated in FIG. 4.

Index 410 may represent one or more indexes that may be stored in one or more memory devices, which may be co-located or remotely located. Index 410 may store information associated with a collection of content in one or more corpora, such as documents, images, videos, audio recordings, etc. For example, index 410 may correspond to an image index that stores information associated with images, e.g., links, addresses, captions, metadata, thumbnails, etc., associated with the images; a video index that stores information associated with video content, e.g., links, addresses, captions, metadata, thumbnails, etc. associated with the video content; an audio index that stores information associated with audio content, e.g., links, addresses, captions, metadata, thumbnails, etc., associated with the audio content; etc. In some implementations, index 410 may store a keyword index associated with the collection of content. The keyword index may include an entry for each item of content, e.g., each document, image, video, audio recording, etc., associated with the index. Index 410 may be generated by server 220 crawling servers 230 and/or 240 to obtain information associated with the collection of content. Alternatively, or additionally, servers 230 and/or 240 may upload information associated with new content, periodically or as the new content is published, to index 410.

Each entry in index 410 may store information identifying an address, such as a uniform resource locator (URL), uniform resource identifier (URI), Internet protocol (IP) address, etc., associated with an item of content within the collection of content, keywords associated with the item of content, etc. and/or information that identifies a measure of image intent assigned to the item of content. The information in the entry may be used by search component 420 to identify whether the document is relevant to a search query.

Search component 420 may receive a search query and perform a search of index 410 based on the search query to identify documents, as search results that are relevant to the search query. Additionally, or alternatively, search component 420 may receive search results, relevant to the search query, from one or more other search systems. Additionally, or alternatively, search component 420 may perform a search of index 410 based on the search query to identify content associated with another corpus, such as images and/or videos, as image results that are relevant to the search query. In some implementations, search component 420 may automatically perform the search to identify the content associated with the other corpus, e.g., before, during, or after performing the search for the documents. In some implementations, search component 420 may perform the search to identify the content, associated with the other corpus, upon the occurrence of some event, such as in response to an instruction received from classifier component 440.

Search component 420 may generate scores for the search results. As described above, each search result may correspond to a document that has been identified as relevant to the search query. In some implementations, the score, for a search result, may reflect a measure of relevance of the corresponding document to the term(s) of the search query. Several techniques exist for measuring the relevance of a document to a search query. In some implementations, the score, for a search result, may reflect a measure of quality of the corresponding document. In these implementations, the search query may be used to identify a relevant document, which is scored based on the document's measure of quality. Several techniques exist for measuring the quality of a document, such as a link-based technique, a technique based on the source of the document, a technique based on an age of the document, a technique based on accesses of the document, etc. In some implementations, the score, for a search result, may reflect a combination of a measure of relevance of the corresponding document to a search query and a measure of quality of the corresponding document. In some implementations, the score, for a search result, may reflect a weighted combination of a measure of relevance of the corresponding document to a search query and a measure of quality of the corresponding document, where the measure of relevance may be weighted differently from the measure of quality. In some implementations, the score, for a search result, may be determined in another manner.

Search component 420 may rank the search results based on the scores. For example, search component 420 may create a list of search results and sort the search results, in the list, based on the scores of the search results. Search component 420 may provide the list of search results to analyzer component 430.

Analyzer component 430 may analyze documents associated with search results received from search component 420 to identify image attributes associated with the documents. For example, analyzer component 430 may obtain, from one or more memories associated with server 220, 230, and/or 240, documents that are indexed within index 410 based on addresses—e.g., URLs, URIs, IP addresses, etc.—associated with the search results.

Analyzer component 430 may analyze image and/or video content included within the documents to identify image attributes associated with the documents. Analyzer component 430 may, for example, analyze text within a document to identify a quantity of keywords—e.g., "image," "picture," "photograph," "movie," "video," "camera," "glamour," etc.—relating to an image and/or video, that correspond to a high probability of image intent—e.g., a measure of image intent that satisfies a threshold. Analyzer component 430 may also, or alternatively, identify a keyword density associated with the document based on the quantity of keywords relative to a quantity of text within the document—e.g., a quantity of words, lines of text, pages of text, etc. Additionally, or alternatively, analyzer component 430 may analyze the document to identify a quantity of images and/or videos within the document—e.g., images, videos, image tags, video tags, etc. Analyzer component 430 may also, or alternatively, identify an image ratio, associated with the document, based on the quantity of images and/or videos relative to the quantity of text. Analyzer component 430 may also, or alternatively, determine an image density associated with the document based on proportions of the images—e.g., in square inches, centimeters, etc.—relative to proportions of the text within the document and/or proportions of the non-image portions of the document. Analyzer component 430 may transmit the image attributes—e.g., the quantities of keywords, keyword densities, quantities of images and/or videos, image densities, image ratios, etc.—associated with the documents, to classifier component 440.

Analyzer component 430 may also, or alternatively, analyze documents in an offline manner. For example, analyzer component 430 may analyze each document, identified in index 410, to identify image attributes associated with each of the documents. Analyzer component 430 may associate, within index 410, respective image attributes with each document stored within index 410. Analyzer component 430 may transmit the image attributes, associated with the indexed documents, to classifier component 440.

Analyzer component 430 may in another offline operation, analyze predetermined documents during an operation to train a classifier, such as classifier component 440. The identification of the predetermined documents and performing the operation to train the classifier will be described in greater detail below. The predetermined documents may include a first set of predetermined documents that have been previously determined to be associated with a high probability of image intent—e.g., measures of image intent that satisfy a probability threshold. The predetermined documents may also, or alternatively, include a second set of predetermined documents that have been previously determined to be associated with a low probability of image intent—e.g., measures of intent that do not satisfy the probability threshold and/or that do not satisfy another probability threshold, where the other probability threshold is less than the probability threshold. Analyzer component 430 may transmit first image attributes associated with the first set of predetermined documents and second image attributes associated with the second set of predetermined documents to classifier component 440 that enables classifier component 440 to generate, as classification metrics, one or more probability thresholds, based on the image attributes, used to classify documents associated with search results.

Classifier component 440 may determine a level of image intent associated with a document. Classifier component 440 may, for example, assign a document, associated with a search result, to one of a set of categories, such as a high probability of image intent category, hereinafter referred to as "high image intent category;" a low probability of image intent category, hereinafter referred to as "low image intent category;" and/or some other image intent category. The category may be based on an image intent score that is generated by, and/or assigned to the document, by classifier component 440. In some implementations, classifier component 440 may assign the document to an image intent category by looking up an entry for the document within an index, e.g., within index 410, and determining whether the high image intent category, the low image intent category, or some other image intent category is associated with the document.

Additionally, or alternatively, classifier component 440 may determine the image intent, associated with a document, based on the image intent score, without assigning the image intent category. Additionally, or alternatively, classifier component 440 may assign the image intent score to the document by looking up an entry, within the index, that stores the image intent score, associated with the document, that was previously determined by classifier component 440.

Classifier component 440 may determine the image intent scores in a number of ways. For example, a keyword score may be assigned to the document that identifies a quantity of keywords, within the document, that matches keywords, hereinafter referred to as "matching keywords," associated with classification metrics. A keyword density score may be assigned to the document that represents a quantity of matching keywords relative to a size of the document or a quantity of text associated with the document. An image score may be assigned to the document based on a quantity of images and/or videos associated with the document. An image ratio score may be assigned to the document based on a quantity of images relative to a size of the document and/or a quantity of text associated with the document. Thus, the level of image intent of the document may be based on one or a combination of the scores and/or some other score associated with image intent. Each of the scores will be described in greater detail below.

Classifier component 440 may, in some implementations, use one or more classification techniques to determine a level of image intent of a document based on image attributes associated with the documents and classification metrics stored within index 410.

Some classification techniques may include determining a quantity of keywords associated with a document, that match keywords identified by the classification metrics. In this example, classifier component 440 may act as a discriminative classifier, such as a support vector machine (SVM), when classifying the document based on comparing keywords within the document to keywords associated with the first set of predetermined documents associated with a high probability of image intent, e.g., "image," "picture," "photograph," "movie," "video," "camera," "glamour," etc., and/or to keywords associated with the second set of predetermined documents associated with a low probability of image intent, e.g., "text," "article," "novel," "story," "literature," etc.

The sets of predetermined documents may be previously identified, by search system 225, based on whether clients 210 obtained image results or search results as a result of particular search queries received from clients 210. Documents associated with the search results may be assigned to the first set of predetermined documents when the image results were obtained by client 210. Documents associated with the search results may be assigned to the second set of predetermined documents when the search results were obtained by the client 210.

Based on a determination that the quantity of matching keywords satisfies a keyword threshold, classifier component 440 may assign the document to a first category (e.g., the high image intent category). If, however, classifier component 440 determines that the quantity of matching keywords does not satisfy another keyword threshold identified by the classification metrics, then classifier component 440 may assign the document to a second category (e.g., the low image intent category). Classifier component 440 may, alternatively, assign the document to a third category (e.g., a neutral image intent category or some other category) based on a determination that the quantity of matching keywords does not satisfy the keyword threshold and satisfies the other keyword threshold.

Additionally, or alternatively, classifier component 440 may assign a keyword score, e.g., KW, to the document based on the quantity of matching keywords associated with the document. The keyword score may increase as the quantity of matching keywords increases and may decrease as the quantity of matching keywords decreases. Assigning the document to the categories and/or assigning the keyword scores may enable search system 225 to determine whether to expend processing resources to retrieve image results that are relevant to the search query.

Additionally, or alternatively, classifier component 440 may assign the keyword score based on a probability model— e.g., a Bayes probability model or some other model. In this example, the keyword score may represent a measure of image intent based on a first probability and a second probability. For example, the keyword score may be based on a first probability, e.g., p(ii), where ii stands for image intent. The first probability may correspond to a likelihood that one or more keywords within the document corresponds to one or more keywords within a second set of predetermined documents associated with search queries with high image intent. The keywords, in this example, may correspond to characters, phonemes, syllables, terms, phrases, etc. associated with a language model, e.g., an n-gram model and/or some other language model.

The keyword score may also be based on a second probability, e.g., p(D) where D represents keywords identified in the first and/or second sets of the predetermined documents. The second probability may represent a likelihood that the document corresponds to the first set of predetermined documents associated with search queries with low image intent and the second set of predetermined documents. Thus, the probability that represents the keyword score may be given by: p(ii|D). Using Bayes' Theorem yields equation (1) below:

$$p(ii|D) \cong (p(ii)*p(D|ii))/p(D) \qquad (1)$$

Further, the second probability may be based on a probability that each keyword, on which the classification metrics are based, occur within the sets of predetermined documents, e.g., $p(D) \cong p(f1, f2, \ldots, fn)$ where $n \geq 1$ and where f1, f2, etc. represent keyword occurrences within the sets of predetermined documents. Substituting p(f1, f2, fn) for p(D) yields equation (2) below:

$$p(ii|D)_{KW} \cong (p_H(ii)*p(f1,\ldots fn|ii))/p(f1,\ldots fn) \qquad (2)$$

where $p_H(ii)$ may be set to a particular value based on the predetermined sets of documents, e.g., 0.5 based on equal probability between the low and high image intent categories. Thus, $$p(ii|D)_{KW} \cong p_H(ii)*(p(f1|ii)*p(f2|ii),\ldots,*p(fn|ii))/ (p(f1)*p(f2),\ldots,*p(fn)) \qquad (3)$$

In the example above, the denominator of equation (3) may represent a constant that is based on the predetermined sets of documents. Therefore, a quantity of times that a particular keyword (f1) occurs within the document, may determine a value associated with a particular quantity, e.g., $p(f1|ii)$. Additionally, or alternatively, the particular quantity may increase as the quantity of occurrences, of the particular keyword, increases and may decrease as the quantity of occurrences, of the particular keyword, decreases.

Additionally, or alternatively, as the quantity of occurrences of one or more of the keywords, e.g., f1, f2, etc., increases, the probability, e.g., $p(ii|D)$, that the document corresponds to search queries with high image intent, increases. Additionally, or alternatively, as the quantity of occurrences of the keywords decreases, the probability that the document corresponds to search queries with high image intent decreases. As the probability that the document corresponds to search queries with high image intent decreases, the probability that the document corresponds to search queries with low image intent increases. The keyword score may, thus, correspond to a probability of image intent given a quantity of occurrences of keywords within the document.

Other techniques may include determining whether a keyword density, associated with a document, satisfies a keyword density threshold identified by the classification metrics. Based on a determination that the keyword density satisfies the keyword density threshold, classifier component 440 may assign the document to the first category. If, however, classifier component 440 determines that the keyword density does not satisfy another keyword density threshold, then classifier component 440 may assign the document to the second category. Classifier component 440 may, alternatively, assign the document to a third image intent category or some other image intent category based on a determination that the keyword density does not satisfy the keyword density threshold and satisfies the other keyword density threshold.

Additionally, or alternatively, classifier component 440 may, in a manner described above, assign a keyword density score, e.g., KD, to the document based on the keyword density. Thus, the keyword density score may increase as the keyword density increases and may decrease as the keyword density decreases. Assigning the document to the categories and/or determining the image intent scores based on a determination of keyword density, may enable search system 225 to determine whether to expend processing resources to retrieve, process, and/or provide image results that are relevant to the search query.

In some implementations and in a manner similar to that described above, the keyword density score may be represented by a probability, e.g., $p(ii|D)$. The probability may be based on a respective keyword density, e.g., fd1, fd2, . . . , fdn where n≥1, for each keyword identified in the document as provided in equation (4) below:

$$p(ii|D)_{KD} \cong p_H(ii)*(p(fd1|ii)*p(fd2|ii), \ldots, *p(fdn|ii))/(p(fd1)*p(fd2), \ldots, *p(fdn)) \quad (4)$$

As shown in equation (4) and in a manner similar to that described above, as the respective keyword density, associated with one or more of the keywords, increases, the probability that the document corresponds to search queries with high image intent, increases. Additionally, or alternatively, as the respective keyword density decreases, the probability that the document corresponds to search queries with high image intent, decreases. The keyword score may, thus, correspond to a probability of image intent given the respective keyword density within the document.

Classification component 440 may, in a manner described above, assign a document to one of the image intent categories, e.g., high image intent category, a low image intent category, and/or some other image intent category, based on a quantity of images and/or videos, an image ratio, and/or an image density associated with the document relative to one or more thresholds, associated with the quantity of images and/or videos, the image ratio, and/or the image density identified by the classification metrics.

Additionally, or alternatively, classification component 440 may, in a manner described above, assign other scores to the document, such as an image score, e.g., I, based on the quantity of images and/or videos associated with the documents, an image ratio score, e.g., IR, based on the quantity of images relative the text within the document, and/or an image density score, e.g., ID, based on proportions of the images to proportions of the text within the document. Assigning the document to the image intent categories and/or determining image intent scores, based on a determination of the quantity of images, image ratio, and/or image density, may enable search system 225 to determine whether to expend processing resources to retrieve, process, and/or provide image results that are relevant to the search query.

In other example implementations and in a manner similar to that described above, the image score, the image ratio score, and/or the image density score may be represented by probabilities, e.g., based on $p(ii|D)$. The probabilities may be based on a respective quantity of images, e.g., fi, a respective image ratio, e.g., fir, and/or a respective image density, e.g., fid, associated with the document as provided in equations (5), (6), and (7) below:

$$p(ii|D)_I \cong p_H(ii)*(p(fi|ii)/p(fi)) \quad (5)$$

$$p(ii|D)_{IR} \cong p_H(ii)*(p(fir|ii)/p(fir)) \quad (6)$$

$$p(ii|D)_{ID} \cong p_H(ii)*(p(fid|ii)/p(fid)) \quad (7)$$

As shown in equations (5) and (6) and in a manner similar to that described above, as the quantity of images and/or the image ratio, associated with the document, increases, the probability that the document corresponds to search queries with high image intent, increases. Additionally, or alternatively, as the quantity of images and/or the image ratio decreases, the probability that the document corresponds to search queries with high image intent, decreases. The image score and/or the image ratio score may, thus, correspond to a probability of image intent given the quantity of images and/or the image ratio, respectively, associated with the document. Additionally, or alternatively, as shown in equation (7) and in a manner similar to that described above, as the image density, associated with the document, increases, the probability that the document corresponds to search queries with high image intent, increases. Additionally, or alternatively, as the image density decreases, the probability that the document corresponds to search queries with high image intent, decreases. The image density score may, thus, correspond to a probability of image intent given the image density associated with the document.

Classification component 440 may also, or alternatively, generate an image intent score based on a total score, e.g., TS, for a document based on a combination of scores assigned to the documents, and/or a weighted total score, e.g., WTS, when each of the scores do not contribute equally to the combined score based on a respective weighting factor. In some implementations, the total score may be based on a sum of the scores, e.g., where $TS \cong KW+KD+I+IR+ID$. In some implementations, the weighted total score may be based on the scores and weighting factors, e.g., W1, W2, W3, W4, etc., associated with each of the scores. In this example, each of the weighting factors may represent a respective contribution of each of the scores, e.g., where $W1+W2+W3+W4$, etc. $\cong 1$.

The weighted total score may, thus, be determined based on the weighted contributions of each of the scores, e.g., where $WTS \cong W1*KW+W2*KD+W3*I+W3*IR+W4*ID$.

Classifier component 440 may determine whether to provide the search results without image results, the search results with the image results, or the image results without the search results based on the image intent score. For example, classification component 440 may determine that all or a portion of the image results, e.g., top 10, top 20, top 50, etc., are to be provided without the search results when a quantity of documents, with an image intent score, e.g., based on the total score and/or the weighted score, that satisfies the high image intent threshold, is greater than a quantity of documents with an image intent score that does not satisfy the high image intent threshold. Classification component 440 may transmit an instruction to search component 420 to provide the image results, if the image results have not already been obtained by search component 420. Search component 420 may receive the instruction and may obtain the image results, using one or more techniques described above, based on a measure of relevance of the image results to the search query and/or a measure of quality of the image results. Search component 420 may also, or alternatively, obtain one or more types of results at the same time and/or in a manner that is not dependent on the instruction, received from classification component 440, to provide the image results or a different type of results.

Classification component 440 may also, or alternatively, determine that the search results are to be provided without the image results when a quantity of documents, with an image intent score that does not satisfy the low image intent threshold, is greater than a quantity of documents with an image intent score that satisfies the low image intent threshold. Classification component 440 may also, or alternatively, determine that the search results and the image results are to be provided when a quantity of documents with an image intent score that does not satisfy the high image intent threshold and satisfies the low image intent threshold, is greater than a quantity of documents with an image intent score that satisfies the high image intent threshold or does not satisfy the low image intent threshold.

Classifier component 440 may generate a search results document, such as a hypertext markup language (HTML) document, that includes the search results, the image results, or a combination of the search results and the image results. Classifier component 440 may provide, to client 210, the search results document in response to the search query.

FIG. 5 is a diagram of an example data structure 500 that stores classification metrics used for determining image intent. Data structure 500 may be stored in a memory associated with server 220. As shown in FIG. 5, data structure 500 may include a collection of fields, such as, for example, a classification metrics field 505, a high probability field 510, and a low probability field 515. The fields within data structure 500 are provided for explanatory purposes. In some implementations, there may be additional fields, fewer fields, different fields, or differently arranged fields than are shown with respect to FIG. 5.

Classification metrics field 505 may store information that identifies a particular type of image attribute. For example, classification metrics field 505 may store information associated with a particular type of image attribute corresponding to a quantity of keywords and/or a keyword density associated with a document. Classification metrics field 505 may, for example, identify a collection of keywords identified, by search system 225, within predetermined documents known to be associated with high image intent, e.g., a measure of image intent that satisfies a threshold. Classification metrics field 505 may also, or alternatively, store information that identifies particular types of image attributes associated with image density, image ratio, quantity of images, etc. associated with a document.

High probability field 510 may store information associated with the particular type of image attribute identified in classification metrics field 505, that corresponds to a first category, e.g., a high image intent category. High probability field 510 may, for example, store a list of keywords associated with a first attribute, e.g., keywords, obtained from a first set of predetermined documents known to be associated with high image intent. Additionally, or alternatively, high probability field 510 may store metrics, associated with other attributes identified in classification metrics field 505, that correspond to the first set of predetermined documents. For example, high probability field 510 may store a first value that represents a keyword density; a second value that represents a quantity of images, a third value that represents an image ratio, a fourth value that represents an image density, etc., of the first set of predetermined documents.

Low probability threshold field 515 may store information associated with the particular type of image attributes identified in classification metrics field 505, that corresponds to a second category, e.g., a low image intent category. Low probability threshold field 515 may, for example, store a list of keywords associated with a first attribute, e.g., keywords, obtained from a second set of predetermined documents known to be associated with low image intent. Additionally, or alternatively, low probability field 515 may store metrics, associated with other attributes identified in classification metrics field 505, that correspond to the second set of predetermined documents. For example, low probability field 510 may store a first value that represents a keyword density; a second value that represents a quantity of images, a third value that represents an image ratio, a fourth value that represents an image density, etc., of the second set of predetermined documents.

Entries associated with fields 505-515, represented by ellipses 522-526, will be described below with respect FIG. 6.

Figure 6:
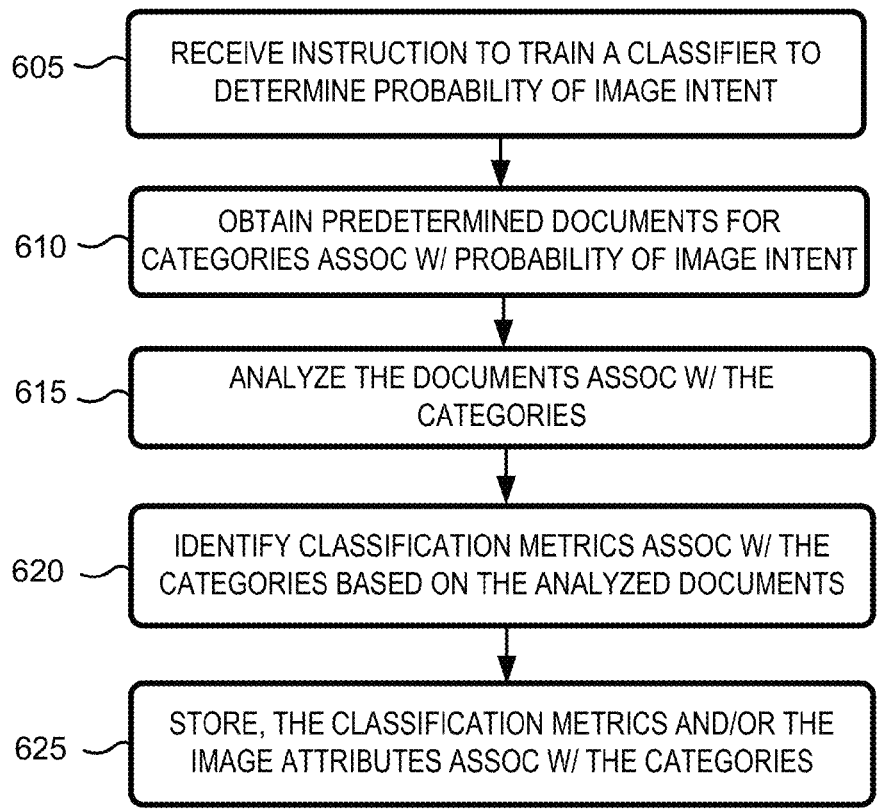
FIG. 6 is a flowchart of an example process for training a classifier to classify a document based on image intent.

FIG. 6 is a flowchart of an example process 600 for training a classifier to classify a document based on image intent. In some implementations, process 600 may be performed by server 220. In some implementations, process 600 may be performed by one or more other devices instead of, or possibly in conjunction with, server 220. For example, some or all of process 600 may be performed by client 210 and/or server 230 or 240.

As shown in FIG. 6, process 600 may include receiving an instruction to train a classifier to determine image intent (block 605) and obtaining predetermined content for categories associated with image intent (block 610). For example, search system 225 may receive, from operator associated with server 220, an instruction to train a classifier associated with search system 225. Server 220 may, in response to the instruction, retrieve a collection of predetermined documents associated with one or more categories associated with image intent. Additionally, or alternatively, server 220 may communicate with servers 230 and/or 240 to obtain all or a portion of the collection of predetermined documents that is not stored by server 220.

The collection of predetermined documents may include a first set of documents associated with search results obtained based on a search using a first search query. The first search query and/or the first set of documents may be known to be associated with a high probability of image intent, e.g., based on a quantity of keywords, a keyword density, a quantity of images, an image ratio, an image density, etc., that satisfies a probability threshold. Additionally, or alternatively, the collection of predetermined documents may include a second set of documents associated with search results obtained based on a search using a second search query. The second search query and/or the second set of documents may be known to be associated with a low probability of image intent that does not satisfy a probability threshold.

As also shown in FIG. 6, process 600 may include analyzing the documents associated with one of the categories (block 615) and identifying classification metrics associated with the categories based on the analyzed documents (block 620). For example, search system 225 may analyze the content, associated with each of the categories, to identify respective image attributes that correspond to each of the categories.

Search system 225 may, in a manner similar to that described above with respect to FIG. 4, analyze the first set of documents and the second set of documents to identify image attributes associated with the first set of documents and the second set of documents, respectively. Search system 225 may, for example, analyze text within each document to identify keywords, such as "image," "picture," "photograph," "movie," "video," "camera," etc., associated with the first set of documents. Search system 225 may also, or alternatively, identify a quantity of keywords associated each document within the first set of documents. Search system 225 may also, or alternatively, identify a keyword density, e.g., the quantity of keywords relative to a quantity of text within the document, relating to images and/or videos, associated with each of the first set of documents. Additionally, or alternatively, search system 225 may analyze the documents to identify a quantity of images and/or videos, an image density, e.g., proportions of images relative to proportions of non-image content, and/or an image ratio, e.g., a quantity of images and/or videos relative to a quantity of text, associated with each of the documents.

Search system 225 may establish one or more first values and/or thresholds associated with a first category, e.g., the high probability of image intent category, based on the identified image attributes associated with the first set of documents. Search system 225 may, for example, generate a first keyword value and/or threshold, e.g., KW–HIGH as shown ellipse 524 of FIG. 5, based on a respective quantity of keywords associated with each of the first set of documents, e.g., an average, a sum, etc.; a first keyword density value and/or threshold, e.g., KD–HIGH as shown ellipse 524 of FIG. 5, based on a respective keyword density associated with each of the first set of documents; a first image value and/or threshold, e.g., IT–HIGH as shown ellipse 524 of FIG. 5, based on a respective quantity of images associated with each of the first set of documents; a first image density value and/or threshold, e.g., ID–HIGH as shown ellipse 524 of FIG. 5, based on a respective image density associated with each of the first set of documents; a first image-to-text ratio value and/or threshold, e.g., IR–HIGH as shown ellipse 524 of FIG. 5, based on a respective image ratio associated with each of the first set of documents; etc. Search system 225 may generate classification metrics, associated with the first category, by associating each of the first values and/or thresholds with the first category.

Search system 225 may, in a manner described above, establish one or more second values and/or thresholds associated with a second category, e.g., a category associated with a low probability of image intent, based on the image attributes associated with the second set of documents. Search system 225 may, for example, analyze text within each document to identify keywords, such as "text," "essay," "article," "novel," etc., associated with the second set of documents. Search system 225 may also, or alternatively, identify a quantity of keywords associated each document within the second set of documents and may generate a second keyword value and/or threshold, e.g., KW–LOW as shown ellipse 526 of FIG. 5. Search system 225 may also, or alternatively, generate a second keyword density value and/or threshold, e.g., KD–LOW as shown ellipse 526 of FIG. 5, based on a respective keyword density associated with each of the second set of documents; a second image value and/or threshold, e.g., IT–LOW as shown ellipse 526 of FIG. 5, based on a respective quantity of images associated with each of the second set of documents; a second image density value and/or threshold, e.g., ID–LOW as shown ellipse 526 of FIG. 5, based on a respective image density associated with each of the second set of documents; a second image-to-text ratio value and/or threshold, e.g., IR–LOW as shown ellipse 526 of FIG. 5, based on a respective image ratio associated with each of the second set of documents; etc. Search system 225 may generate classification metrics, associated with the second category, by associating each of the second values and/or thresholds with the second category.

As further shown in FIG. 6, process 600 may include storing the classification metrics and/or the image attributes associated with the categories (block 625). Search system 225 may store, in a memory associated with server 220, e.g., index 410, the image attributes associated with the categories and the classification metrics associated with the categories. Search system 225 may, from time-to-time, obtain updated predetermined sets of documents associated with the categories and may generate updated classification metrics based on image attributes associated with the updated sets of predetermined documents. Search system 225 store, in the memory, e.g., by overwriting, erasing, etc. the classification metrics, the updated classification metrics and/or the image attributes, associated with the updated predetermined sets of documents.

Figure 7:
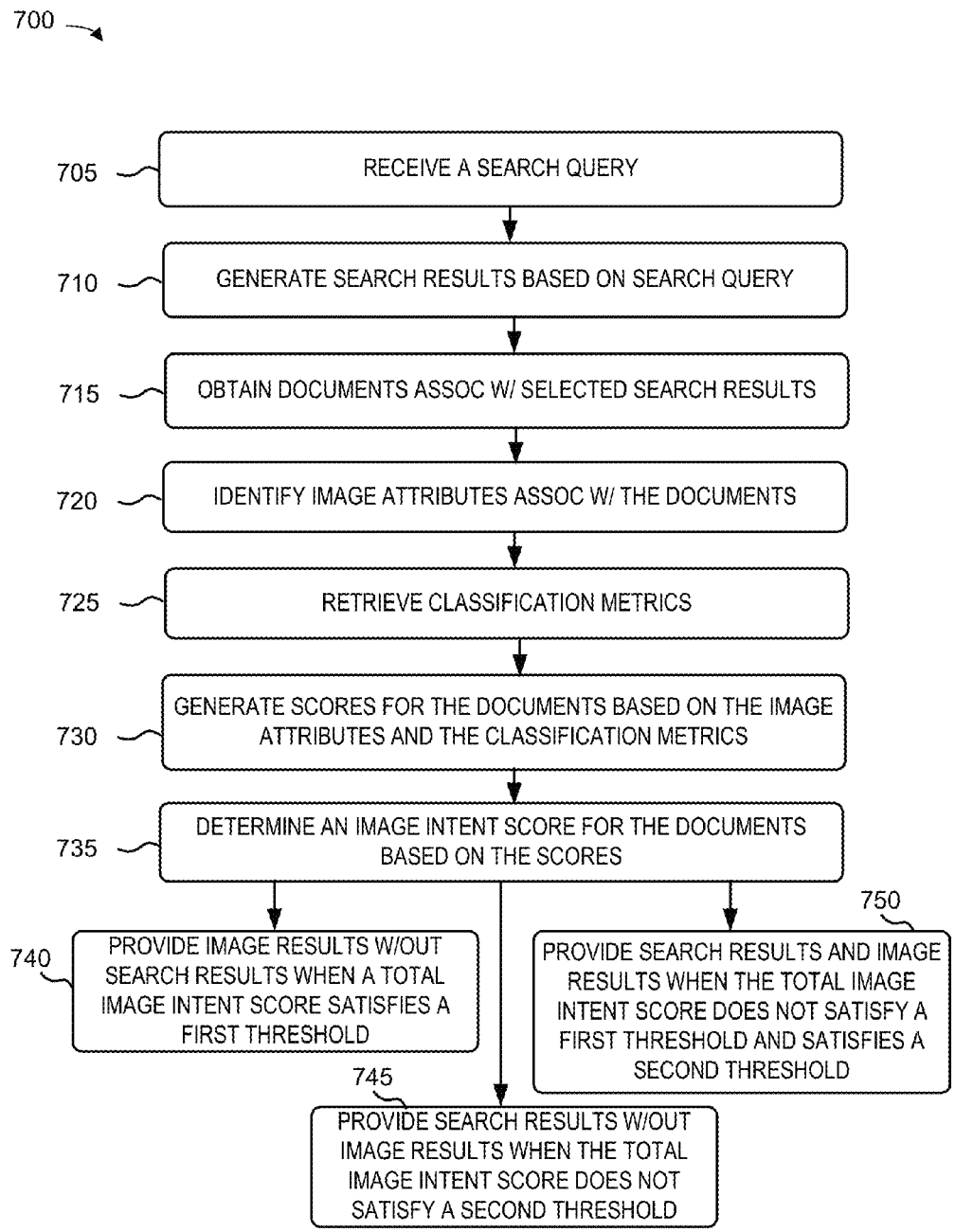
FIG. 7 is a flowchart of an example process for determining whether to generate image results based on image intent associated with a search query.

FIG. 7 is a flowchart of an example process for determining whether to generate image results based on image intent associated with a search query. In some implementations, process 700 may be performed by server 220. In some implementations, process 700 may be performed by one or more other devices instead of, or possibly in conjunction with, server 220. For example, some or all of process 700 may be performed by client 210 and/or server 230 or 240.

As shown in FIG. 7, process 700 may include receiving a search query (block 705) and generating search results based on the search query (block 710). For example, a user of client 210 may use a browser, such a web browser, to access a user interface of search system 225. Via the user interface, the user may enter a search query. Client 210 may transmit the search query to search system 225. Search system 225 may receive the search query from client 210.

As described above, search system 225 may perform a search of one or more indexes, such as index 410, to identify documents, as search results that are relevant to the search query. Search system 225 may determine scores for the search results based on measures of relevance of the search results to the search query and/or based on measures of quality associated with the search results. Search system 225 may rank the search results based on the scores, as described above.

Process 700 may include obtaining documents associated with selected search results (block 715) and identifying image attributes associated with the documents (block 720). For example, search system 225 may select one or more of the search results with scores that satisfy a threshold. In some implementations, search system 225 may select search results associated with the top L scores, where L≥1.

Search system 225 may obtain documents, e.g., web pages, etc., associated with the selected search results, as described above. Search system 225 may analyze the documents to determine image attributes associated with the documents. As described above, the image attributes, for one of the documents, may identify a quantity of matching keywords, a keyword density, a quantity of images, an image-to-text ratio, an image density, etc. associated with the document.

Process 700 may include retrieving classification metrics (block 725) and generating scores for the documents based on the image attributes and the classification metrics (block 730). For example, as described above, search system 225 may generate scores for the documents based on each of the image attributes relative to respective classification metrics associated with each of the image attributes. Search system 225 may, as described above and for a particular document, generate a keyword score based on a degree of match, between keywords within the document and keywords identified by the classification metrics. Search system 225 may also, or alternatively, generate a keyword density score based on a keyword density, associated with the document, relative to a keyword density identified by the classification metrics.

Search system 225 may also, or alternatively, generate an image score based on a quantity of images, associated with the document, relative to a quantity of images identified by the classification metrics. Search system 225 may also, or alternatively, generate an image ratio score based on an image ratio, associated with the document, relative to an image ratio identified by the classification metrics. Search system 225 may also, or alternatively, generate an image density score based on an image density, associated with the document, relative to an image density identified by the classification metrics. In some implementations, search system 225 may, in a manner similar to that described above with respect to FIG. 4, use a probability model, e.g., a Bayesian probability model, etc., to generate the scores based on the quantity of keywords, the keyword density, the quantity of images, the image ratio, the image density, etc.

In some implementations, search system 225 may look up an entry, associated with a document, within one or more indexes and may obtain, from one of the indexes, the scores that were previously determined by search system 225—e.g., as a result of an offline operation. In other words, search system 225 may process the documents, e.g., analyze the documents, identify measures of image intent, generate scores for the documents, etc., in an offline manner. Search system 225 may store, in the indexes, information obtained as a result of the processing, e.g., search results, documents, scores, etc., which may be looked up in the indexes when needed.

Process 700 may include determining an image intent score based on the scores (block 735). For example, search system 225 may, as described above, determine an image intent score based on a combined score of the keyword score, the keyword density score, the image score, the image-to-text ratio score, the image density score, etc. when each of the scores contributes equally, e.g., based on a sum of the scores, an average of the scores, etc. Additionally, or alternatively, the image intent score may be determined based on a combined score when each of the scores does not contribute equally to the combined score, e.g., based on weighting factors W1, W2, W3, W4, etc.

Additionally, or alternatively, search system 225 may generate a total image intent score for the documents based on the combined image intent scores, e.g., a sum of the image intent scores, an average of the image intent scores, etc.

Process 700 may include providing image results without the search results when a total image intent score satisfies a first threshold (block 740). For example, search system 225 may determine whether the total image intent score satisfies a first threshold associated with high image intent. When the total image intent score satisfies the first threshold, search system 225 may provide the image results in a manner that does not include the search results.

Additionally, or alternatively, search system 225 may determine that the image results are to be provided, without the search results, when a quantity of all or a portion of the documents, e.g., top 5, top 10, top 100, etc., with image intent scores that satisfy another first threshold, associated with high image intent, is greater than a quantity of all or a portion of the documents, e.g., top 5, top 10, top 100, etc., with image intent scores that do not satisfy the other first threshold.

When the image results are to be provided without the search results, search system 225 may, for example, generate image results that are relevant to the search query. Search system 225 may, for example and as described above, perform a search of one or more indexes, such as index 410, to identify a collection of images, as image results, that are relevant to the search query. Search system 225 may, as described above, determine scores for the search results based on measures of relevance of the image results to the search query and/or based on measures of quality associated with the image results. Search system 225 may rank the image results based on the scores, in a manner similar to that described above. Search system 225 may generate a search results document that includes the image results and may provide the search results document to client 210.

Process 700 may include providing search results, without the image results, when the total image intent score does not satisfy a second threshold (block 745). For example, search system 225 may determine whether the total image intent score does not satisfy a second threshold associated with low image intent. When the total image intent score does not satisfy the second threshold, search system 225 may provide the search results in a manner that does not include the image results.

Additionally, or alternatively, search system 225 may determine that the search results are to be provided, without the image results, when a quantity of all or a portion of the documents, e.g., top 5, top 10, top 100, etc., with image intent scores that do not satisfy another second threshold, associated with low image intent, is greater than a quantity of all or a portion of the documents, e.g., top 5, top 10, top 100, etc., with image intent scores that satisfy the other second threshold.

When search results are to be provided without the image results, system 225 may generate a search results document that includes the search results, e.g., a shown in FIG. 1B, and may provide the search results document to client 210. The search results may, in some implementations, be ordered based on scores associated with the search results.

Process 700 may include providing the search results and the image results when the total image intent score does not satisfy the first threshold and satisfies the second threshold (block 750). For example, search system 225 may determine whether the total image intent score does not satisfy the first threshold and satisfies the second threshold. When the total image intent score does not satisfy the first threshold and satisfies the second threshold, search system 225 may provide a combination of the search results and the image results.

Additionally, or alternatively, search system 225 may determine that a combination of the search results and the image results are to be provided when a quantity of all or a portion of the documents, with image intent scores that do not satisfy the other first threshold and that satisfy the other second threshold, is greater than a quantity of the documents with image intent scores that satisfy the other first threshold or do not satisfy the other second threshold.

When a combination of the search results and the image results are to be provided, search system 225 may generate the image results as described above. Search system 225 may generate a search results document that includes all or a portion of the search results, e.g., the selected search results, and all/or a portion of the image results—e.g., as shown in FIG. 1C. In some implementations, the search results may be ranked based on the scores assigned to the search results. Additionally, or alternatively, the image results may be ranked based on the scores assigned to the image results. Additionally, or alternatively, the search results may be presented, via a first section of the search results document and the image results may be presented via a second, different section of the search results document. In some implementations, search result system 225 may interleave the image results between search results—e.g., as shown in FIG. 1C. For example, the search results document may include a first search result, e.g., associated with a score assigned to the first search result; followed by one or more, or all, of the image results; and followed by a second search result,—e.g., associated with a next-highest score relative to the score associated with the first search result.

In some implementations, search system 225 may, as described above, provide the selected search results, to client 210, in an order that is based on combined scores associated with the second scores and the scores that are based on the measure of relevance to the search query. Additionally, or alternatively, search system 225 may provide, to client 210, a search results document, such as an HTML-based document, that includes the selected search results ranked in one of the orders described above.

Systems and/or methods, described herein, may enable a search system to identify measures of image intent for document, associated with search results that are generated by the search system based on receiving a search query. The measure of image intent may represent a likelihood that a user, of a client device from which the search query was received, intended that image results be provided based on the search query. The measure of image intent may, thus, enable the search system to determine whether to generate the image results and/or provide the search results or a combination of the image results and the search results.

The foregoing description provides illustration and description, but is not intended to be exhaustive or to limit the implementations to the precise form disclosed. Modifications and variations are possible in light of the above implementations or may be acquired from practice of the implementations.

For example, while series of blocks have been described with regard to FIGS. 6 and 7, the order of the blocks may be modified in some implementations. Further, non-dependent blocks may be performed in parallel.

Also, example user interfaces have been described with respect to FIGS. 1B and 1C. In some implementations, the user interfaces may include additional items of information, fewer items of information, different items of information, or differently arranged items of information.

Additionally, while some examples of scores and thresholds were described above, other examples are possible in addition to, or in lieu of, the scores and/or thresholds described above. For example, in some implementations, a value that is described as satisfying a threshold may be greater than, or equal to, the threshold. In some implementations, a value that is described as satisfying a threshold may not be greater than, or equal to, the threshold. In some implementations, a value that is described as not satisfying a threshold may be less than, or equal to, the threshold. In some implementations, a value that is described as not satisfying a threshold may not be less than, or equal to, the threshold.

As used herein, the term component refers to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by at least one of one or more server devices and from a client, a search query;
   obtaining, by at least one of the one or more server devices, search results based on the search query,
      the search results identifying documents relevant to the search query;
   identifying, by at least one of the one or more server devices, image attributes associated with one or more of the documents,
      the image attributes identifying information, within the one or more of the documents, associated with images;
   obtaining, by at least one of the one or more server devices, classification metrics that include information for determining a measure of image intent associated with the search query,
      the measure of image intent representing a likelihood that image results are intended by the search query,
      the image results identifying images or video relevant to the search query, and
      the classification metrics identifying a plurality of keywords;

determining, by at least one of the one or more server devices, the measure of image intent, associated with the search query, based on the image attributes and the classification metrics, the image attributes, for a particular document of the one or more of the documents, corresponding to at least one of:

a particular quantity of keywords, within the particular document, that match the plurality of keywords identified by the classification metrics, or a particular keyword density based on the particular quantity of keywords and a quantity of text within the particular document;

determining, by the at least one of the one or more server devices, whether the measure of image intent satisfies a threshold, the threshold being identified by the classification metrics;

generating, by at least one of the one or more server devices, a search results document that selectively includes the image results or the search results based on whether the measure of image intent satisfies the threshold; and providing, to the client, the search results document.

2. The method of claim 1,
where determining whether the measure of image intent satisfies the threshold includes:
determining that the measure of image intent does not satisfy the threshold, and
where generating the search results document includes:
formatting the search results document to include the search results and not include the image results based on determining that the measure of image intent does not satisfy the threshold.

3. The method of claim 1,
where the search results include links via which the documents can be accessed,
where the documents correspond to web pages associated with the links, and
where the image results are associated with at least one of:
images that are relevant to the search query, or
video content that is relevant to the search query.

4. The method of claim 1, where the image attributes, for the particular document of the one or more of the documents, further correspond to at least one of:
a quantity of images or videos identified within the particular document,
an image-to-text ratio based on the quantity of images and the quantity of text, or
an image density based on a first area, within the particular document, associated with the quantity of images or videos and a second area associated with the particular document.

5. The method of claim 1,
where the classification metrics include at least one of:
the plurality of keywords,
the plurality of keywords being associated with a document that was obtained based on a particular search query associated with a particular measure of image intent that reflects an intent for image results,
a quantity of keywords that is based on the plurality of keywords,
a keyword density of the document,
a quantity of images or videos associated with the document,
an image-to-text ratio of the document, or
an image density of the document.

6. The method of claim 5, where determining the measure of image intent further includes at least two of:
assigning a first score to the particular document, based on the particular quantity of keywords, within the particular document, that match the plurality of keywords;
assigning a second score, to the particular document, based on the particular keyword density of the particular document and the keyword density;
assigning a third score, to the particular document, based on a particular quantity of images or videos, associated with the particular document, and the quantity of images or videos;
assigning a fourth score, to the particular document, based on a particular image-to-text ratio, of the particular document, and the image-to-text ratio; or
assigning a fifth score, to the particular document, based on a particular image density of the particular document and the image density; and
generating a combined score, for the particular document, based on at least two of the first score, the second score, the third score, the fourth score, or the fifth score.

7. The method of claim 1,
where determining the measure of image intent includes:
generating an image intent score, associated with the search query, based on a respective combined score generated for each of the one or more of the documents,
the measure of image intent being the image intent score, and where generating the search results document includes:
formatting the search results document based on generating the image intent score,
the search results document including the image results without the search results when the image intent score satisfies a first threshold identified by the classification metrics,
the search results document including the search results without the image results when the image intent score does not satisfy a second threshold identified by the classification metrics,
the second threshold being less than the first threshold, or
the search results document including a combination of all or a portion of the search results and the image results when the image intent score does not satisfy the first threshold and satisfies the second threshold,
the threshold being one of the first threshold or the second threshold.

8. The method of claim 1, further comprising:
determining a first quantity of the one or more of the documents with scores that do not satisfy a particular threshold and a second quantity, of the one or more of the documents, with scores that satisfy the particular threshold,
the particular threshold being identified by the classification metrics, and where generating the search results document includes:
formatting the search results document based on the first quantity and the second quantity,
the search results document including the search results and not including the image results when the first quantity is less than the second quantity, and the search results document including the image results and not including the search results when the first quantity is not less than the second quantity.

9. The method of claim 1, where obtaining the classification metrics comprises:
 obtaining first search results based on first predetermined search queries that are known to be associated with first measures of image intent that reflect an intent for image results;
 obtaining second search results based on second predetermined search queries that are known to be associated with second measures of image intent that do not reflect the intent for image results;
 identifying first image attributes corresponding to documents associated with the first search results;
 identifying second image attributes corresponding to documents associated with the second search results; and
 generating the classification metrics based on the first image attributes and the second image attributes.

10. A non-transitory computer-readable medium storing instructions, the instructions comprising:
 a plurality of instructions which, when executed by one or more processors, cause the one or more processors to:
  receive a search query from a client;
  obtain search results based on the search query,
   the search results identifying documents relevant to the search query;
  identify image attributes associated with one or more of the documents,
   the image attributes identifying information, within the one or more of the documents, associated with images;
  obtain classification metrics that include information for determining a measure of image intent associated with the search query,
   the measure of image intent representing a likelihood that image results are intended for the search query,
   the image results identifying images or videos relevant to the search query, and
   the classification metrics identifying a plurality of keywords;
  determine the measure of image intent, associated with the search query, based on the image attributes and the classification metrics,
   the image attributes, for a particular document of the one or more of the documents, corresponding to at least one of:
    a particular quantity of keywords, within the particular document, that match the plurality of keywords identified by the classification metrics, or
    a particular keyword density based on the particular quantity of keywords and a quantity of text within the particular document;
  generate a search results document that selectively includes the image results or the search results based on the measure of image intent; and
  provide, to the client, the search results document.

11. The non-transitory computer-readable medium of claim 10, where one or more instructions, of the plurality of instructions, to generate the search results document cause the one or more processors to:
 determine that the measure of image intent does not satisfy a threshold; and
 format, based on determining that the measure of image intent does not satisfy the threshold, the search results document to include the search results and not include the image results.

12. The non-transitory computer-readable medium of claim 10, where the classification metrics include at least one of:
 the plurality of keywords,
  the plurality of keywords being associated with a document that was obtained based on a particular search query associated with a particular measure of image intent that reflects an intent for image results,
 a quantity of keywords that is based on the plurality of keywords,
 a keyword density of the document,
 a quantity of images or videos associated with the document,
 an image-to-text ratio of the document, or
 an image density of the document.

13. The non-transitory computer-readable medium of claim 12, where one or more instructions, of the plurality of instructions, to determine the measure of image intent, further cause the one or more processors to at least two of:
 assign a first score to the particular document, of the one or more of the documents, based on the particular quantity of keywords, within the particular document, that match the plurality of keywords;
 assign a second score, to the particular document, based on the particular keyword density of the particular document and the keyword density;
 assign a third score, to the particular document, based on a particular quantity of images or videos, associated with the particular document, and the quantity of images or videos;
 assign a fourth score, to the particular document, based on a particular image-to-text ratio, of the particular document, and the image-to-text ratio; or assign a fifth score, to the particular document, based on a particular image density of the particular document and the image density; and
 generate a combined score, for the particular document, based on at least two of the first score, the second score, the third score, the fourth score, or the fifth score.

14. The non-transitory computer-readable medium of claim 13,
 where one or more instructions, of the plurality of instructions, to determine the measure of image intent cause the one or more processors to:
  generate an image intent score, associated with the search query, based on a respective combined score generated for each of the one or more of the documents,
   the measure of image intent being the image intent score, and
 where one or more instructions, of the plurality of instructions, to generate the search results document cause the one or more processors to:
  format the search results document based on generating the image intent score,
   the search results document including the image results without the search results when the image intent score satisfies a first threshold identified by the classification metrics,
   the search results document including the search results without the image results when the image intent score does not satisfy a second threshold identified by the classification metrics, the second threshold being less than the first threshold, or the search results document including a combination of all or a portion of the search results and the image results when the image intent score does not satisfy the first threshold and satisfies the second threshold.

15. A system comprising:

one or more server devices at least partially implemented in a hardware to:

receive a search query from a client;

obtain search results based on the search query, the search results identifying documents relevant to the search query; identify image attributes associated with one or more of the documents, the image attributes identifying information, within the one or more of the documents, associated with images;

obtain classification metrics that include information for determining a measure of image intent associated with the search query, the measure of image intent representing a likelihood that image results are intended by the search query, the image results identifying images or videos relevant to the search query, the classification metrics identifying a plurality of keywords, and the image attributes, for a particular document of the one or more of the documents, corresponding to at least one of:

a particular quantity of keywords, within the particular document, that match the plurality of keywords identified by the classification metrics, or a particular keyword density based on the quantity of keywords and a quantity of text within the particular document;

generate, based on the image attributes and the classification metrics, a search results document that selectively includes the image results or the search results; and provide, to the client, the search results document.

16. The system of claim 15, where the one or more server devices, when generating the search results document, are to:

format the search results document to include the search results and not include the image results.

17. The system of claim 16, where the classification metrics include at least one of:

a first threshold associated with a quantity of keywords within a document that was obtained based on a particular search query associated with a measure of image intent that reflects an intent for images, a second threshold associated with a keyword density of the document, a third threshold associated with a quantity of images within the document, a fourth threshold associated with an image-to-text ratio of the document, or a fifth threshold associated with an image density of the document.

18. The system of claim 16, where the one or more server devices, when determining the measure of image intent, are further to at least two of:

assign a first score to the particular document, of the one or more of the documents, based on the particular quantity of keywords, within the particular document, that match the plurality of keywords identified by the classification metrics, assign a second score, to the particular document, based on the particular keyword density of the particular document and another keyword density identified by the classification metrics, assign a third score, to the particular document, based on a first quantity of images or videos, associated with the particular document, and a second quantity of images or videos identified by the classification metrics, assign a fourth score, to the particular document, based on a first image-to-text ratio, of the particular document, and a second image-to-text ratio identified by the classification metrics, or assign a fifth score, to the particular document, based on a first image density, of the particular document, and a second image density identified by the classification metrics; and generate a combined score, for the particular document, based on at least two of the first score, the second score, the third score, the fourth score, or the fifth score.

19. The system of claim 15, where the one or more server devices, when generating the search results document, are to:

determine a first quantity of the one or more of the documents with scores that do not satisfy a particular threshold and a second quantity, of the one or more of the documents, with scores that satisfy the particular threshold, the particular threshold being identified by the classification metrics, and format the search results document based on the first quantity and the second quantity, the search results document including the search results and not including the image results when the first quantity is less than the second quantity, and the search results document including the image results and not including the search results when first quantity is not less than the second quantity.

20. The system of claim 15, where, when obtaining the classification metrics, the one or more server devices are further to:

obtain first search results based on first predetermined search queries that are known to be associated with first measures of image intent that reflect an intent for images;

obtain second search results based on second predetermined search queries that are known to be associated with second measures of image intent that do not reflect the intent for images;

identify first image attributes corresponding to documents associated with the first search results;

identify second image attributes corresponding to documents associated with the second search results; and generate the classification metrics based on the first image attributes and the second image attributes.

* * * * *